Feb. 24, 1959 E. H. HAHN 2,874,807
HYDRAULICALLY AND MECHANICALLY OPERATED DISC BRAKE
Filed Aug. 27, 1956 3 Sheets-Sheet 2

INVENTOR
EMIL H. HAHN
BY
ATTORNEYS

Feb. 24, 1959 E. H. HAHN 2,874,807
HYDRAULICALLY AND MECHANICALLY OPERATED DISC BRAKE
Filed Aug. 27, 1956 3 Sheets-Sheet 3

INVENTOR
EMIL H. HAHN
BY *Robbs Cobb*
ATTORNEYS

United States Patent Office 2,874,807
Patented Feb. 24, 1959

2,874,807

HYDRAULICALLY AND MECHANICALLY OPERATED DISC BRAKE

Emil H. Hahn, St. Joseph, Mich., assignor, by mesne assignments, to Lambert Brake Corporation, St. Joseph, Mich., a corporation of Michigan Application August 27, 1956, Serial No. 606,323

6 Claims. (Cl. 188—72)

The present invention relates to disc brakes, and more particularly to a hydraulically and mechanically operated disc brake for use on tractors or other machinery or implements having a rotary shaft or other member to be braked.

Particularly in the farm tractor field, the tractor brakes have heretofore been primarily mechanical brakes. However, the modern trend in tractor design, as well as in the design of many types of road machinery or implements, is to include a hydraulic system for operating various hoists or for operating other mechanisms, thus providing a ready source of hydraulic power for the operation of brakes.

An object of the present invention, therefore, is to provide a brake for use on tractors or other machinery or implements having a source of hydraulic pressure fluid for operating the brake.

Another object is to provide a hydraulically operated disc brake for use on tractors or the like having a source of hydraulic pressure fluid for operating the brake, said brake also having auxiliary mechanical means for operating the brake in emergency situations, such as, for example, when the hydraulic system is depleted of fluid or is otherwise inoperable.

A further object is to provide a disc brake as aforesaid which is automatically adjusted responsive to wear of the friction lining material with which such brakes are usually provided.

Still another object is to provide a disc brake, as aforesaid, which is self-energizing, whereby braking loads applied to the brake serve to aid in applying the brake. This objective is preferably accomplished by the utilization of a pair of coaxially arranged actuator discs disposed in side-by-side relation and having a plurality of oppositely inclined ramped seats generated or drilled into opposing faces of the discs, and rolling elements or balls trapped in the seats and operative upon relative rotation of the discs to force the discs axially apart, thereby effecting torque- or load-responsive energization of the brake.

A further object is to provide a disc brake in accordance with the foregoing, wherein the discs are so constructed and supported that self-energization of the brake is precluded when the friction lining material needs replacement, while the brake remains operative as a non-energized brake, thus affording a warning for the need for lining replacement by virtue of the increase in the requirements for brake-applying pressure on the operating means to effect brake operation.

Other objects and advantages will be hereinafter described or will become apparent to those skilled in the art, and the novel features of the invention will be defined in the appended claims.

In the accompanying drawings.

Like reference characters in the several figures of the drawings and in the description designate corresponding parts.

Figure 1:
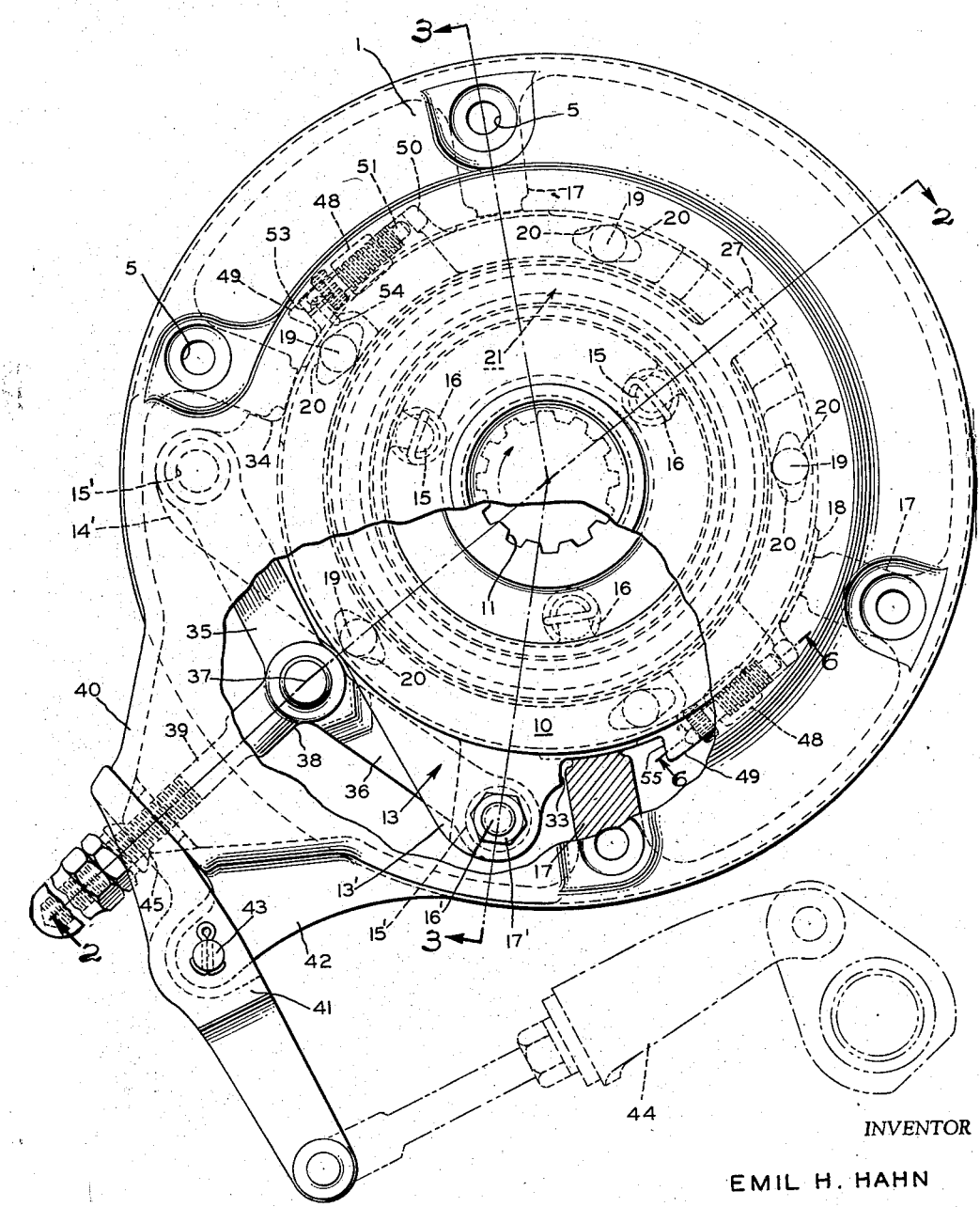
Fig. 1 is a view in side elevation of a brake embodying the invention, with a portion of the housing broken away to partially disclose the interior construction.
Figure 2:
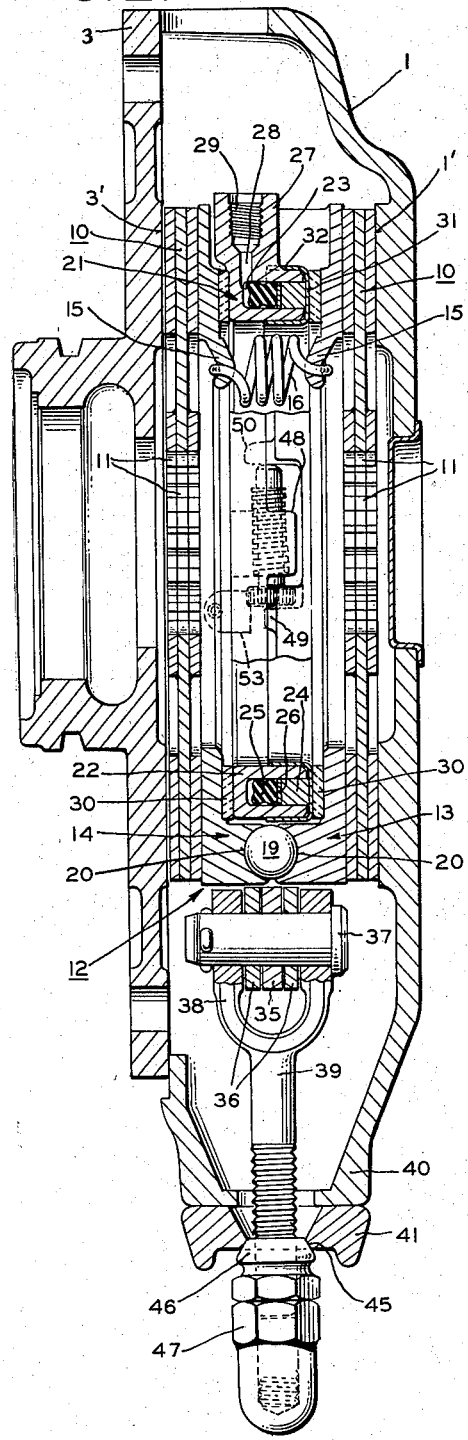
Fig. 2 is a view in section, as taken on the line 2—2 of Fig. 1.

The brake herein shown preferably comprises a fixed housing or casing having a bell-like outboard section 1 provided with an axially-extended marginal flange 2 which is in abutting engagement with an inboard closure plate 3. These parts are adapted to be rigidly interconnected and mounted upon a wall or flange 4 (shown in broken lines in Fig. 3) of a transmission housing of a farm tractor or other implement, and for this purpose, the marginal flange 2 of the housing section 1 and the inboard plate 3 of said housing are provided with aligned openings 5 disposed in circumferentially spaced relation thereabout for receiving a like number of screws or other fasteners (not shown) adapted to engage in a threaded recess 6 in the transmission housing wall 4.

Figure 3:
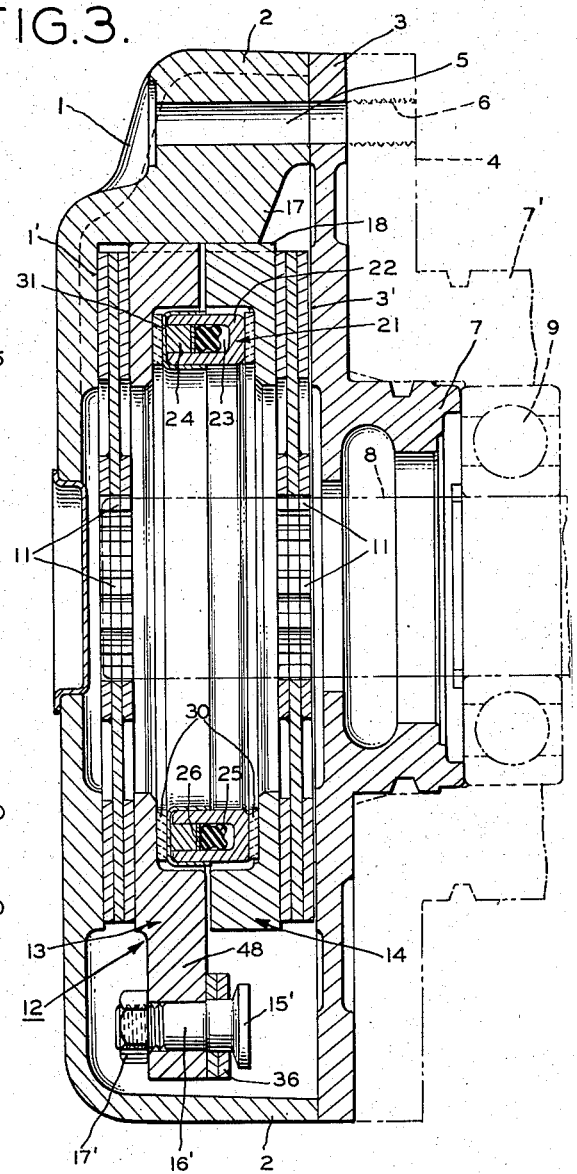
Fig. 3 is a view in section, as taken on the line 3—3 of Fig. 1.

As seen in Fig. 3, the inboard wall of the housing has a central, axially-extended hub 7 which is adapted to be disposed in a complemental supporting portion 7' of the transmission housing 4, with a rotary shaft 8 projecting into the brake housing through the hub 7 and journalled in a bearing 9, the shaft 8 and bearing 9 also being shown in broken lines.

It is to be understood that the shaft 8 may constitute a countershaft of a farm tractor which is rotated by the power transmission system of the tractor in such a manner that braking of the shaft 8 will effect braking of the tractor wheels through the power transmission system. However, the brake of the present invention is not limited to use on such a countershaft.

Interiorly thereof, the brake housing is provided with a pair of radially extended, axially spaced, opposed friction surfaces 1' and 3' on the outboard housing section 1 and the inboard housing wall 3, respectively. Disposed between the friction surfaces 1' and 3' is a pair of friction discs 10, 10 of annular form, these discs 10 being provided with a central opening therethrough, through which the shaft 8 is adapted to project, and the inner peripheries of the discs 10 are preferably splined, as at 11, or otherwise suitably adapted for connection to the shaft 8 for rotation therewith and for axial shifting movements thereon.

Disposed between the friction discs 10 is an actuator disc assembly generally designated 12, said assembly including an outboard disc 13 and an inboard disc 14 disposed in side-by-side relation. The actuator discs 13 and 14 are generally ring-shaped, and on their inner peripheries are provided with a suitable number of ears 15 disposed in opposed relation to one another, with tension springs 16 interconnected at their respective opposite ends to the opposed ears 15 and resiliently biasing the actuator discs 13 and 14 towards one another.

Disposed in spaced relation about the inner periphery of the flange 2 of the outboard housing section 1 is a plurality of radially inwardly extended supporting lugs 17 having bearing contact with bearing pads 18 on the outer periphery of the actuator discs 13 and 14, so that the discs 13 and 14 are concentrically mounted within the housing for rotative and axial shifting movements relative to the lugs 17.

Means are disposed between the actuator discs 13 and 14 for shifting said discs axially so as to slide said friction discs 10 on the shaft 8 into engagement with the friction surfaces 1' and 3' aforesaid. Such means include a plurality of camming balls 19 disposed in circumferentially and equidistantly spaced relation between the actuator discs 13 and 14 and seating in oppositely inclined ramped seats 20 which are preferably drilled or otherwise generated in the opposing faces of the discs 13 and 14. The tension springs 16 normally retain the balls 19 in the deepest parts of the ramped seats 20, but upon relative rotation of the discs 13 and 14, the balls 19 will effect a camming action in the seats 20, whereby the discs 13 and 14 will be forced axially apart.

Means are provided for initially shifting the discs axially apart, the latter means comprising an annular hydraulic actuator device generally designated 21. This actuator device 21 includes an annular cylinder body 22 having an annular piston chamber 23 therein, with an annular piston 24 reciprocably disposed in the piston chamber and projecting therefrom at the open side of the chamber. Disposed behind the piston 24 in the piston chamber 23 is an annular seal 25 which is preferably of the so-called "quad-ring" type, and an annular back-up washer or ring 26 is interposed between the piston 24 and the seal 25. By virtue of this specific piston-seal-washer arrangement, the piston 24 need not be precisely fitted in the piston chamber 23, and the back-up washer 26 will prevent the seal 25 from protruding into any space between the walls of the piston chamber and the piston, resulting from manufacturing tolerances.

In order to admit the flow of pressure fluid into and out of the piston chamber 23, the actuator body 22 is provided with a radially projecting neck 27 on its outer periphery, said neck having a fluid passage 28 therethrough communicating with the piston chamber, and the neck 27 also being drilled and tapped, as at 29, for connection to a suitable fluid conduit (not shown) which is adapted to supply pressure fluid from a suitable source of supply. In the case of some models of conventional farm tractors which are provided with a hydraulic system for operating hoists or other auxiliary equipment, pressure fluid may be supplied to the actuator device 21 from such hydraulic power system; otherwise, pressure fluid may be supplied to the actuator device 21 from a conventional master-cylinder (not shown) which may be either foot or manually operated, as is customary.

Interposed between the annular actuator device 21 and the contiguous portions of the actuator discs 13 and 14 is a pair of insulator rings 30, 30 which are preferably bonded or otherwise suitably secured to the discs 13 and 14 and which are preferably composed of a suitable heat-insulating material having a high asbestos content. In addition, a dust-shield or cover 31 is preferably disposed between the actuator piston 24 and the insulator ring 30 between said piston and the outboard actuator disc 13, this shield 31 having peripheral flanges overlying the inner and outer peripheries of the actuator body 22, so that dirt, lining dust, mud, or other foreign material is precluded from fouling the piston 24 in the piston chamber. The dust shield 31 is preferably notched at 32 so as to engage the coupling neck 27 to prevent rotation of the dust shield 31 on the cylinder body 22.

Accordingly, the dust shield 31 serves the additional purpose of preventing the translation of relative rotary movements of the discs to the actuator body 22 and the piston 24, thus substantially prolonging the life of the annular actuator assembly 21.

When fluid under pressure is admitted to the annular actuator 21, the cylinder body 22 and the piston 24 will exert an expansive force upon the actuator discs 13 and 14, thereby forcing these discs axially apart, so that said discs will frictionally grip the friction discs 10 between the respective discs 13 and 14 and the friction surfaces 1' and 3' of the brake housing. In order for the camming balls 19 to effect self-energization of the brake, either disc 13 or disc 14 must be anchored against rotative movement, while the other disc 13 or 14, as the case may be, remains free for slight rotative movement. Accordingly, the outboard disc 13 is provided with a radially extended abutment 33 (see Fig. 1) on its outer periphery which is adapted to abut with one of the lugs 17 of the housing section 1 so as to prevent counter-clockwise rotation of the disc 13; and the inboard disc 14 is provided with a similar anchor projection 34 adapted to abut with another of the lugs 17 in the housing section 1 to prevent clockwise rotation of the disc 14. Thus, it will be seen that the respective discs 13 and 14 are free to rotate in one direction only, and when the shaft 8, and accordingly the discs 10, are rotating in a counter-clockwise direction, the outboard disc 13 will be restricted from rotative movement, while the inboard disc 14 will "clock" along with the friction discs 10, thereby effecting a camming action of the balls 19 in the ramped seats 20. Conversely, when the shaft 8, and accordingly the friction discs 10, are rotating in a clockwise direction, the inboard disc 14 will be anchored against rotation, and the outboard disc 13 will be free for braking torque responsive rotation along with the discs 10 to effect self-energization of the brake through the camming action of the balls 19 in the seats 20.

Alternative means are preferably provided for actuating the brake, such alternative means being mechanical and including a pair of pull links 35 and 36 which are respectively pivotally connected at one end to the actuator discs 13 and 14, and which are connected together at their respective opposite ends, as by means of a pivot pin 37 which also serves to connect the links 35 and 36 to a clevis 38, said clevis 38 having a shank 39 projecting out of the brake housing through a neck 40 for connection to an operating lever 41. The operating lever 41 is pivotally mounted upon a supporting ear 42 on the housing section 1, as by means of a pivot pin 43. One end of the lever 41 is suitably connected to operating means 44, shown in broken lines in Fig. 1, for rocking the lever 41 about its pivotal mounting 43. The other end of the lever 41 has a universal connection to the shank 39 of the clevis 38. Preferably, the last-mentioned end of the lever 41 has a socket 45 therein in which is swively seated a complemental head 46 which is threadedly mounted upon the shank 39 for axial adjustment thereon and which is adapted to be locked in adjusted positions by a cap nut 47 or the like, said cap nut serving as a jam nut.

As previously mentioned, the links 35 and 36 are pivotally connected to the actuator discs 13 and 14, and for this purpose, said discs are respectively provided with radially outwardly projecting ears on their outer peripheries, the ear on disc 13 being designated 13', and the ear on disc 14 being designated 14'. Each link 35 and 36 is pivotally connected to the ears 13' and 14' as by means of a pivot element 15' (see Fig. 3) having a shank 16' extending through a complemental opening in the respective ears and secured therein as by means of a nut 17'.

Accordingly, upon operating the means 44 to rock the lever 41 in a counter-clockwise direction about its pivotal mounting 43, a pull will be exerted upon the clevis 38, whereby the pivotal connection 15' of the links 35 and 36 to the actuator discs 13 and 14 will be pulled towards one another. This will result in relative rotation of the discs 13 and 14, with consequent axial separation of these discs by the camming action of the balls 19, and the actuator discs 13 and 14 will press the friction discs 10 against the friction surfaces 1' and 3' in the brake housing. Load on the brake, as in the case when the brake is actuated by the hydraulic actuating means, previously described, will effect self-energization of the brake through the camming action of the balls 19 as one of the abutments or stop-projections 33 or 34 engages with one of the lugs 17 to prevent rotative movement of disc 13 or disc 14, depending upon the direction of rotation of the shaft 8 as well as the discs 10.

Among the salient features of the invention is the provision of automatic means for compensating for wear of the friction discs 10 and for precluding further self-energization of the brake when the discs 10 are fully worn.

Figure 4:
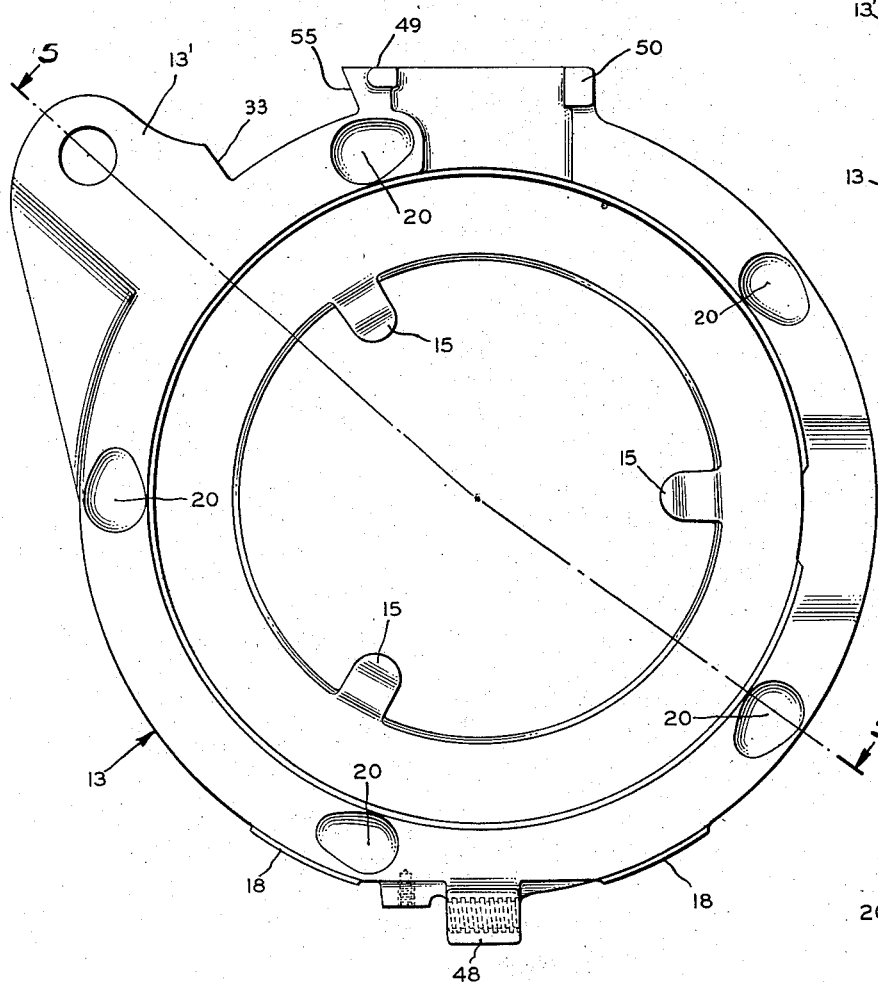
Fig. 4 is a detail view in side elevation of one of the two identical actuator discs.
Figure 5:
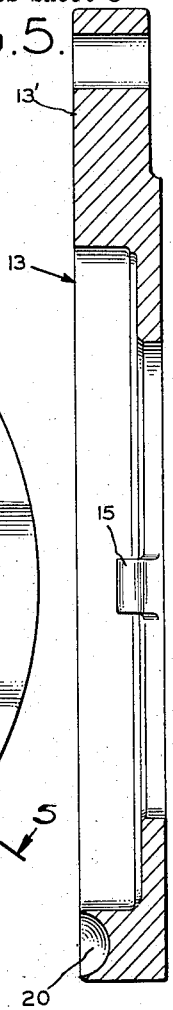
Fig. 5 is a view in section, as taken on the line 5—5 of Fig. 4.
Figure 6:
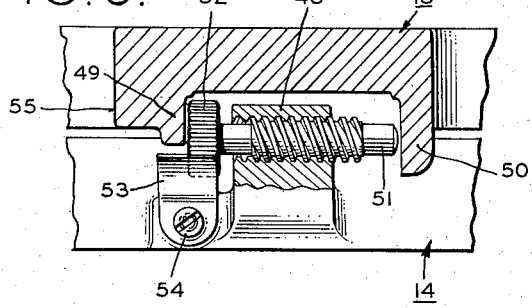
Fig. 6 is an enlarged fragmentary view in section of the brake disc screw adjusting means, as taken on the line 6—6 of Fig. 1, with certain parts shown in elevation.

Accordingly, as is best seen in Figs. 4 and 6, each of the discs 13 and 14 is provided with a screw supporting lug 48 projecting generally radially therefrom at its outer periphery, and in diametrically spaced relation to said lug 48, each disc is provided with a pair of spaced abutments 49 and 50. The disc shown in Fig. 4 illustrates the relative locations of the lug 48 and abutments 49 and 50, and the discs 13 and 14 are preferably formed identically, so that in manufacturing the brake hereof, a pair of identical discs are merely turned face-to-face and rotated 180° with relation to one another so that the lug 48 on one disc is disposed between the abutments 49 and 50 on the other disc.

Disposed in each of the lugs 48 is a one-way shiftable member 51, preferably in the form of a headed screw having threads thereon of the multiple-lead type, with the respective screws 51 projecting from the supporting lugs 48 towards the respective abutments 49 and 50 for engagement with the latter at the opposite ends of the screws. The periphery of the head of each of the screws 51 is provided with a plurality of teeeth or serrations 52 adapted to be engaged by a spring dog or pawl 53 which is preferably secured to the respective abutments 49 as by means of a screw 54. These springs pawls prevent rotation of the screw of the adjusters in one direction, but upon relative rotation of the discs 13 and 14, occasioned by operation of the brake, will effect engagement of the lead ends of the screws 51 with the abutments 50, so that the screws 51 are forced to rotate and back up in the supporting lugs 48 for a distance determined by the amount of wear of the discs 10, less a predetermined release clearance. In order to provide such release clearance, the length of the screws 51 is slightly less than the distance between the abutments 49 and 50, as is best seen in Fig. 6.

Each of the abutments 49 is extended circumferentially and is provided with a stop shoulder 55 which is adapted to engage with one of the supporting lugs 17 as the friction discs 10 become substantially fully worn. Accordingly, further rotative movement of the discs 13 and 14 relative to one another will be precluded, with the result that further automatic adjustment of the brake is precluded, and at the same time, further self-energization of the brake will be precluded. When the brake attains such a substantially fully worn condition, and further self-energization is precluded, this will serve as a warning that the brake needs service, but the brake will remain operative by the hydraulic actuator device 21, since the discs 13 and 14 will remain free for axial movements. However, increased pressure will be required to apply the brake in the absence of self-energization.

While the specific details have been herein shown and described, changes and alterations may be resorted to without departing from the spirit of this invention as defined in the appended claims.

I claim:

1. A disc brake of the class described, comprising stationary means having radially extended, opposed and axially spaced friction surfaces, a pair of friction discs disposed between said friction surfaces and adapted to be mounted upon a rotary member to be braked for rotation therewith and for axial movements thereon and into engagement with said friction surfaces, a pair of relatively stationary actuator discs mounted for relative axial and limited relative rotative movements in opposite directions and disposed between said friction discs, said actuator discs each having an annular outer peripheral piloting flange extending axially toward the other, means engageable with said flanges for shiftably supporting said actuator discs, cooperative abutment means on said supporting means and said actuator discs including a first abutment on each actuator disc disposed radially outwardly of the outer periphery thereof for selectively anchoring the respective actuator discs against rotation according to the direction of rotation of the member to be braked, and a separate abutment on the respective actuator discs also disposed radially outwardly of the outer periphery thereof in circumferentially spaced relation to the first abutment for preventing rotation of the respective actuator discs beyond a predetermined limit, means for shifting said actuator discs axially apart to press the respective friction discs aforesaid into engagement with said friction surfaces, means biasing said actuator discs towards one another to release the brake, and self-adjuster means on said actuator discs for limiting return movements of the actuator discs to compensate for wear of said friction discs, said self-adjuster means including a one-way shiftable member carried by one of said actuator discs, and means on the other actuator disc for shifting said one-way shiftable member upon brake application responsive to wear of said friction discs to limit release movements of said actuator discs.

2. A disc brake as defined in claim 1, wherein said actuator means for shifting the actuator discs axially apart includes camming means between the axially extended piloting flanges on the actuator discs for forcing the discs axially apart responsive to relative rotation of said actuator discs, said means for effecting such relative rotation of the actuator discs including link means connected to said discs.

3. A disc brake as defined in claim 1, wherein said actuator means for shifting the actuator discs axially apart includes camming means between the axially extended piloting flanges on the actuator discs for forcing the discs axially apart responsive to relative rotation of said actuator discs, said means for effecting such relative rotation of the actuator discs including link means connected to said discs an operating lever pivotally mounted intermediate its ends on said stationary means, and adjusting means interconnected with said link means and extending freely through one end of the operating lever, said adjusting means including an adjustable clevis, said clevis having a threaded shank and being pivotally connected at its clevis end to said links and universally connected at its threaded end with the end of the operating lever through which it extends.

4. A disc brake as defined in claim 1, wherein said actuator means for shifting the actuator discs axially apart includes camming means between the axially extended piloting flanges on the actuator discs for forcing the discs axially apart responsive to relative rotation of said actuator discs incident to engagement of said actuator discs with said friction discs, and a hydraulic actuator device operatively disposed between said actuator discs and piloted on the axially extended piloting flanges thereof for shifting the latter axially apart.

5. A disc brake as defined in claim 1, wherein said actuator means for shifting the actuator discs axially apart includes camming means between the axially extended piloting flanges on the actuator discs for forcing the discs axially apart responsive to relative rotation of said actuator discs incident to engagement of said actuator discs with said friction discs, and a hydraulic actuator device operatively disposed between said actuator discs radially within and piloted on said piloting flanges thereof for shifting the latter axially apart, said hydraulic actuator device including a separate unitary annular actuator body having an annular piston chamber therein, an annular piston reciprocably mounted in said piston chamber, an axially movable non-rotatable annular dust shield embracing the annular actuator body and enclosing the piston within the piston chamber, and said piston and actuator body aforesaid operatively abutting the respective actuator discs for actuating engagement therewith.

6. A disc brake as defined in claim 1, wherein said one-way shiftable member has the form of a screw, a threaded support in which said screw is mounted on one of said actuator discs, and a pair of abutments on the other actuator disc, said screw projecting towards said abutments at its opposite ends for engagement therewith so as to be shifted axially in its support upon relative rotative movement of said actuator discs.

References Cited in the file of this patent

UNITED STATES PATENTS

| | | |
|---|---|---|
| 2,375,854 | Lambert | May 15, 1945 |
| 2,387,039 | Parrett | Oct. 16, 1945 |

FOREIGN PATENTS

| | | |
|---|---|---|
| 804,068 | Germany | Apr. 16, 1951 |
| 729,726 | Great Britain | May 11, 1955 |

UNITED STATES PATENT OFFICE
CERTIFICATE OF CORRECTION

Patent No. 2,874,807                        February 24, 1959

Emil H. Hahn

It is hereby certified that error appears in the printed specification of the above numbered patent requiring correction and that the said Letters Patent should read as corrected below.

Column 3, line 26, for "so-called "quad-ring"" read -- lobed --.

Signed and sealed this 23rd day of August 1960.

(SEAL)
Attest:

KARL H. AXLINE
Attesting Officer

ROBERT C. WATSON
Commissioner of Patents